(12) United States Patent
Kolehmainen

(10) Patent No.: US 8,049,388 B2
(45) Date of Patent: Nov. 1, 2011

(54) ROTOR FOR A PERMANENT-MAGNET ELECTRICAL MACHINE

(75) Inventor: Jere Kolehmainen, Merikaarto (FI)

(73) Assignee: ABB OY, Helsinki (FI)

( * ) Notice: Subject to any disclaimer, the term of this patent is extended or adjusted under 35 U.S.C. 154(b) by 65 days.

(21) Appl. No.: 12/439,283

(22) PCT Filed: Aug. 31, 2007

(86) PCT No.: PCT/FI2007/000218
§ 371 (c)(1),
(2), (4) Date: Mar. 6, 2009

(87) PCT Pub. No.: WO2008/025873
PCT Pub. Date: Mar. 6, 2008

(65) Prior Publication Data
US 2010/0019597 A1    Jan. 28, 2010

(30) Foreign Application Priority Data
Aug. 31, 2006    (FI) .................................. 20060785

(51) Int. Cl.
*H02K 1/14*    (2006.01)
*H02K 1/27*    (2006.01)
(52) U.S. Cl. ........................... 310/156.56; 310/216.055
(58) Field of Classification Search ............ 310/156.48, 310/156.53–156.58, 216.055
See application file for complete search history.

(56) References Cited

U.S. PATENT DOCUMENTS

| | | | |
|---|---|---|---|
| 4,445,062 A | 4/1984 | Glaser | |
| 6,147,428 A * | 11/2000 | Takezawa et al. | 310/156.57 |
| 6,525,442 B2 * | 2/2003 | Senoh et al. | 310/156.48 |
| 6,774,523 B2 * | 8/2004 | Ahn et al. | 310/216.023 |
| 6,917,133 B2 * | 7/2005 | Koharagi et al. | 310/156.57 |
| 7,151,335 B2 * | 12/2006 | Tajima et al. | 310/156.48 |
| 7,321,177 B2 * | 1/2008 | Uchida et al. | 310/216.019 |
| 7,385,328 B2 * | 6/2008 | Melfi | 310/156.45 |
| 2003/0011267 A1 | 1/2003 | Vollmer | |
| 2003/0173853 A1 | 9/2003 | Knauff et al. | |
| 2007/0096577 A1 | 5/2007 | Guven et al. | |

FOREIGN PATENT DOCUMENTS

| | | |
|---|---|---|
| DE | 8427703 | 1/1986 |
| EP | 1 276 212 A2 | 1/2003 |
| EP | 1 420 500 A1 | 5/2004 |
| FR | 2802726 A1 | 6/2001 |
| JP | 2001186698 | 7/2001 |
| JP | 2003264947 | 9/2003 |
| WO | WO 03/023940 A1 | 3/2003 |

OTHER PUBLICATIONS

Form PCT/ISA/210 (International Search Report) dated Nov. 14, 2007.
Form PCT/ISA/237 (Written Opinion of the International Searching Authority).
FI Search Report dated Feb. 5, 2007, 1 page.

* cited by examiner

*Primary Examiner* — Tran Nguyen
(74) *Attorney, Agent, or Firm* — Buchanan Ingersoll & Rooney PC

(57) ABSTRACT

The object of the invention is a rotor for an electrical machine excited by permanent magnets, said rotor comprising a substantially cylindrical magnetic body of the rotor fitted onto the shaft of the electrical machine and a set of permanent magnets used to create a first and a second pole alternately in the circumferential direction, excited in opposite directions. The permanent magnets are fitted into openings arranged within the rotor. The rotor comprises a body part with several segments extending to the outer circumference in the circumferential direction and an outward tapered section remaining between the segments in the radial direction of the rotor. Permanent-magnet pieces are arranged between each section and segment.

20 Claims, 4 Drawing Sheets

ROTOR FOR A PERMANENT-MAGNET ELECTRICAL MACHINE

Figure 1:
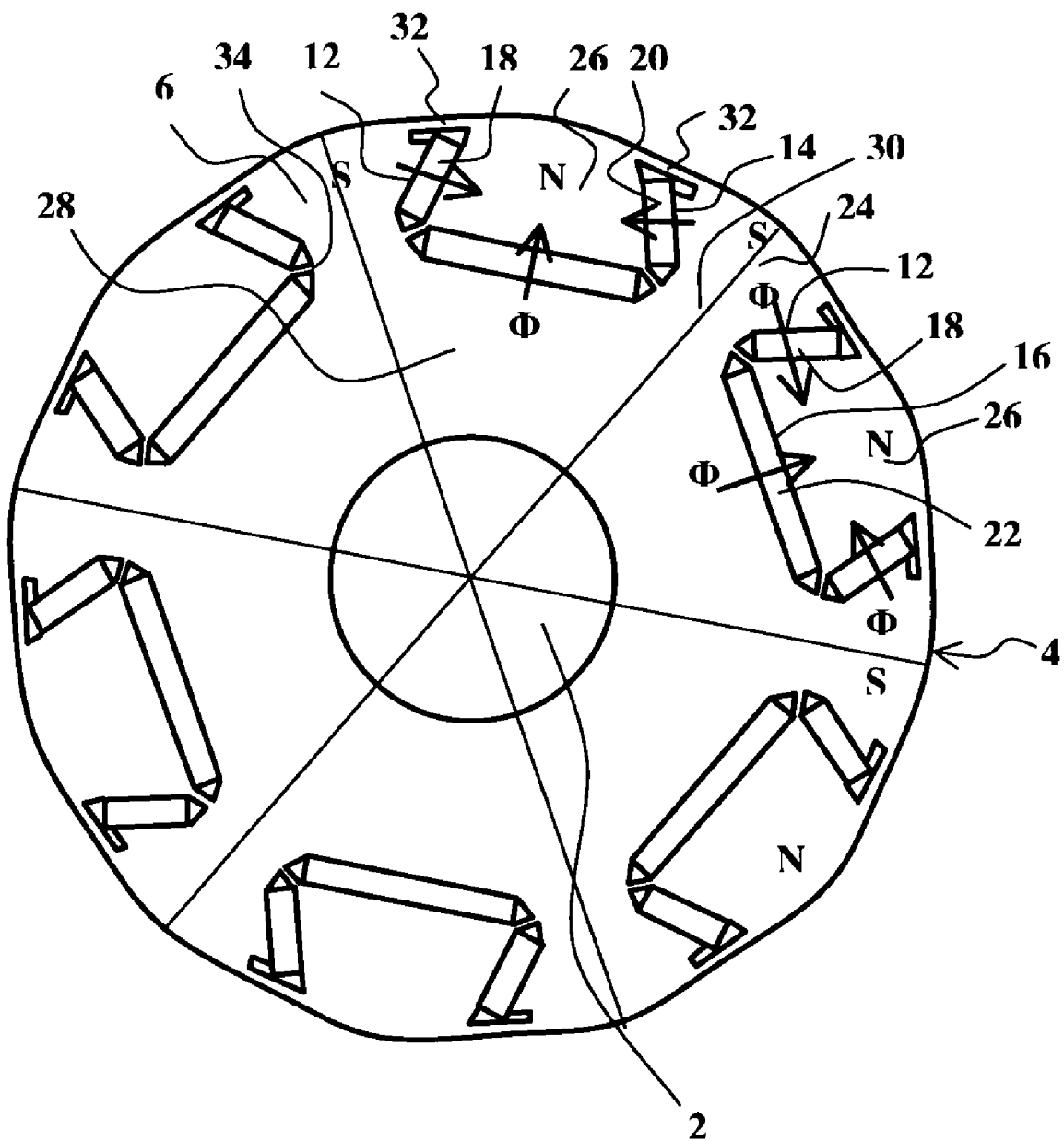

The object of the invention is a rotor for a permanent-magnet electrical machine according to the preamble of claim 1.

Electrical machines excited by permanent magnets have been a competitive alternative for several years. In particular, synchronous machines excited by permanent magnets have become more common in various applications owing to their simple structure and ease of control. Permanent magnets fitted onto the rotor are used to create the field that excites the electrical machine, and two structural solutions are available. Either the permanent-magnet pieces are installed onto the outer surface of the rotor, or the permanent-magnet pieces are installed into the rotor. The present invention concerns the latter structural alternative—that is, a synchronous machine excited by permanent magnets in which the permanent-magnet pieces are embedded into the rotor. More precisely, in the object of the invention, the permanent-magnet pieces are located within the rotor's frame or pole pieces assembled of magnetically conductive parts so that when viewed in the axial direction of the machine, the permanent-magnet pieces are nearly radial to the rotor at least in part, and the main magnetic flux originating from the pieces bends in the rotor between two permanent magnets through the magnetically conductive parts towards the air gap of the machine, constituting the rotor's magnetic pole.

In rotors implemented with permanent magnets, the magnetic flux generated with permanent magnets must be guided to go as perfectly as possible over the air gap to the stator of the electrical machine and further through the stator's magnetic body back over the air gap to the rotor. Any stray flux that does not follow the intended and designed route will deteriorate the electrical machine's operating characteristics and efficiency. One of the factors deteriorating the magnetic characteristics of the rotor is caused by magnetically conductive parts at the end of the permanent magnets facing the air gaps that constitute a route for the flux from one pole to another. One of the reasons for this structural solution is the mechanical durability required of the rotor, particularly against centrifugal forces.

For example, a synchronous-machine rotor is known from the application publication US2003/0173853 A1 in which the permanent magnets are fitted between two segments formed of metal sheet. In this solution, an extrusion or cam is formed in the segments, and the edge of the permanent magnets facing the outer circumference rests on the extrusion or cam due to the effect of centrifugal forces.

The purpose of the present invention is to develop a new structural solution for a permanent-magnet rotor in which the centrifugal forces affecting the different parts of the rotor are in control, the magnetic flux follows the planned route and any stray flux from one pole to another is minimised. In order to achieve this, the invention is characterised by the features specified in the characteristics section of claim 1. Certain other preferred embodiments of the invention are characterised by the features listed in the dependent claims.

The solution according to the invention makes the structure of a permanent-magnet rotor rigid, and all of the structural parts of the rotor are supported by the rotor body part that is directly attached onto the rotor shaft. The rotor body is shaped so that it contains several segments extending to the outer circumference of the rotor, with both sides of the segments forming an acute angle with the surface of the part in question adjacent to the outer circumference of the rotor. Therefore a part or section with a triangular or nearly trapezoidal cross-section is formed between adjacent rotor body parts extending to the outer circumference, said part or section being narrower at the outer circumference of the rotor compared to the other end of the area that is closer to the shaft. The part fitted into this section is supported by the sides of the body part segments and is locked in place in the radial and tangential directions. This creates a shape-locked structure, the parts of which will stay in position also at high speeds and over great variations in speed without any separate support elements. The solutions according to the invention supports the pole structure against the forces towards the axis of the rotor and towards outer surface of the rotor.

The side edges of the sections and the side edges of the segments on the opposite sides of the permanent magnets are straight and the sections are smoothly tapering towards the outer circumferential surface of the rotor. The structure is simple and the permanent magnets can be made of one piece in the radial direction.

According to a preferred embodiment of the invention, the segments connecting to the rotor body part are substantially narrower than the outward tapered sections remaining between them. According to the embodiment, the permanent magnets arranged between the sections and segments are excited so that only the sections form the poles of the rotor, while the segments implement the support function according to the invention. This solution provides a machine with a smaller number of poles and a higher rotational speed.

According to a preferred embodiment, the magnetically conductive parts of the rotor are manufactured of sheets assembled into a sheet pack. In this case, the parts constituting the segment and the section can be connected to each other with narrow necks of material. Alternatively, the necks can be removed fully or partially after assembly of the rotor is completed. Of the sheets, the segments and sections can be manufactured separately, in which case the segments, and correspondingly the sections, are made uniform by bolting or gluing, for example.

According to yet another embodiment, the rotor body part and the segments and sections related to it are manufactured by casting. In this case, the parts are appropriately machined after casting. Alternatively, they can be manufactured of powder metal. The different parts can also be manufactured in different ways, e.g. the body part and the segments of a sheet pack and the sections of powder metal, etc.

According to an embodiment, the sections and segments are separate from each other and can be manufactured separately.

Figure 2:
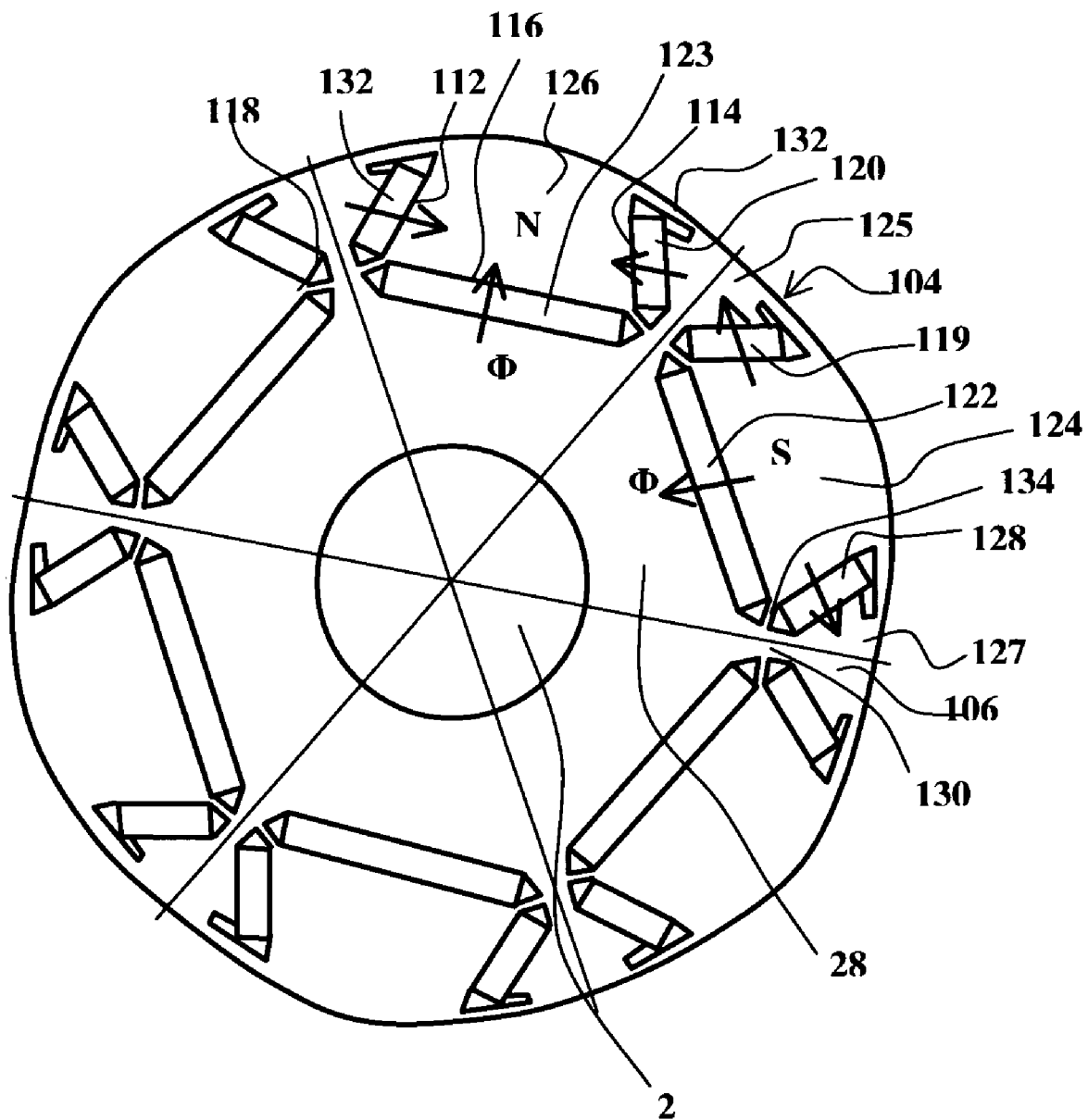
Figure 3:
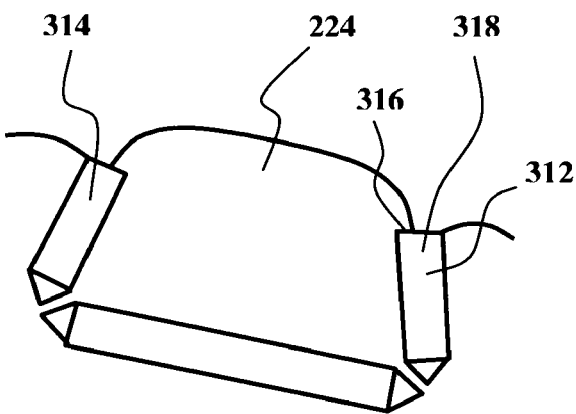
Figure 4:
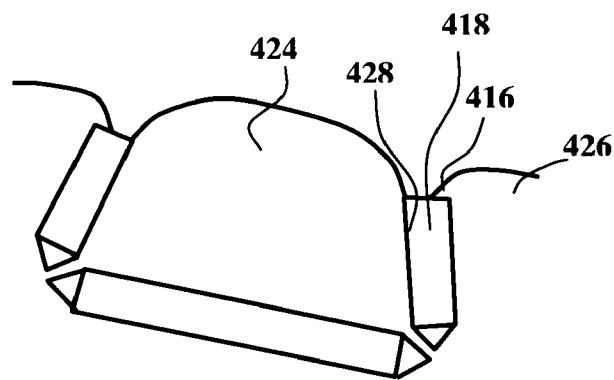
Figure 5:
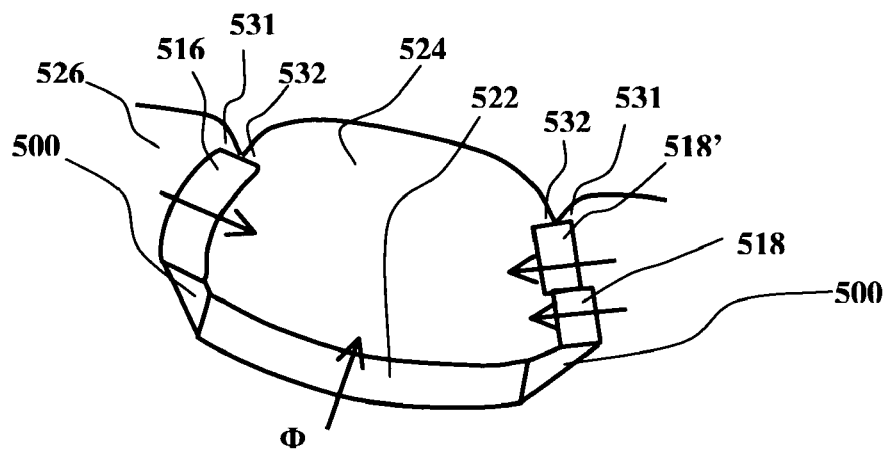
Figure 6:
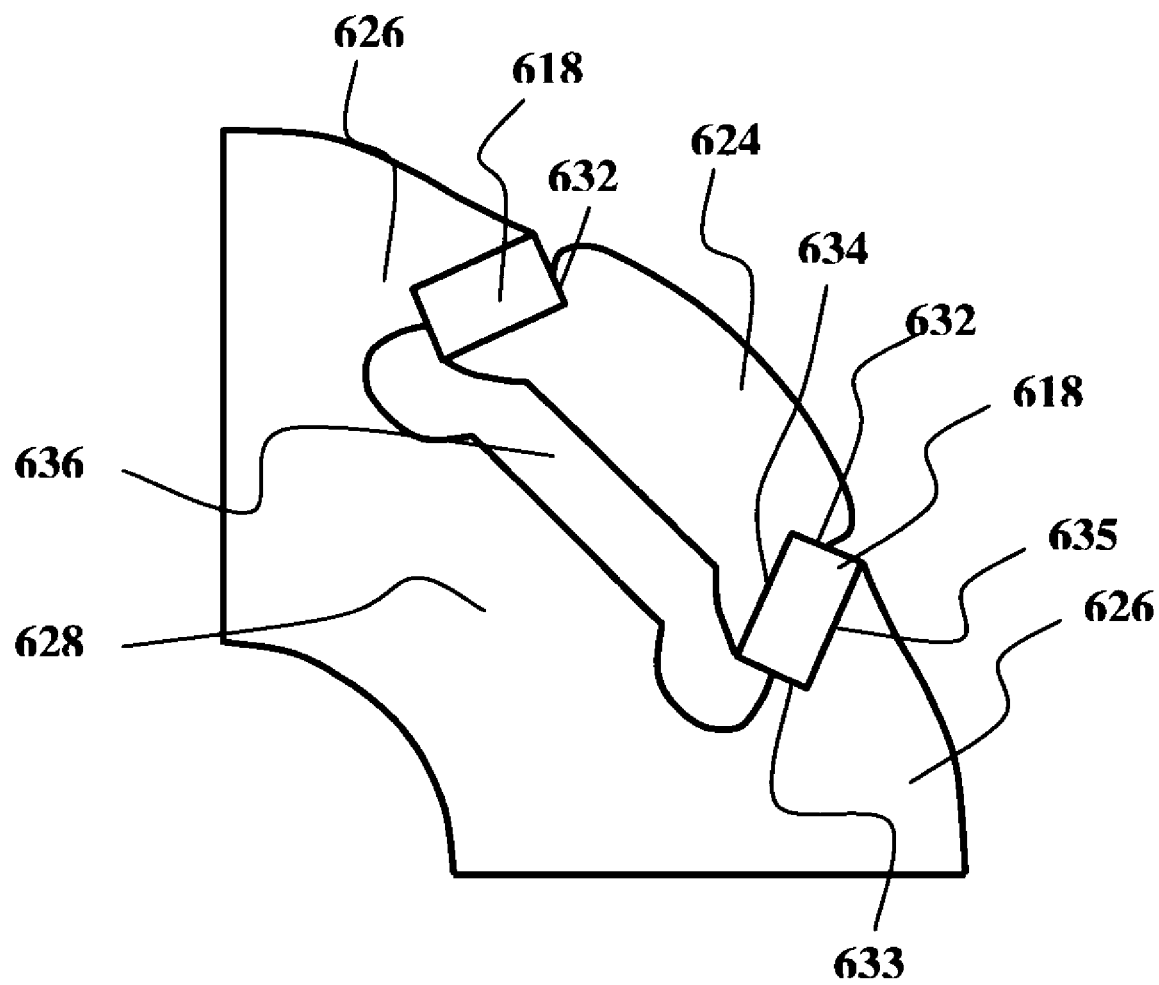

In the following the invention will be described in more detail with the help of certain embodiments by referring to the enclosed drawings, where FIG. 1 illustrates the cross-section of a rotor according to the invention, FIG. 2 illustrates the cross-section of another rotor according to the invention, FIG. 3 illustrates a solution according to the invention in which the cavity of a permanent magnet is open to the air gap, FIG. 4 illustrates another solution according to the invention in which the cavity of a permanent magnet is open to the air gap, FIG. 5 illustrates different alternatives for implementing the permanent-magnet pieces and FIG. 6 illustrates an alternative solution according to the invention in which the cavity of a permanent magnet is open to the air gap.

FIG. 1 illustrates a solution implemented according to the invention as a cross-section viewed in the direction of the rotor shaft 2. The rotor 4 is created using a well-known method by stacking ferromagnetic sheets 6 into a sheet pack, and a shaft 2 is installed in the middle into holes die-cut into the sheets for the purpose. The holes, like the openings in the sheet for the permanent-magnet pieces, can also be formed using the well-known methods of laser cutting or water cutting. The outer circumference of the rotor is slightly waved or heart-shaped so that at the middle of the magnetic poles, the radius of the rotor is greater than between the poles. The shape of the rotor's outer circumference is not crucial for the present invention; it can also be round or piecewise curved as illustrated by the examples in FIGS. 3 to 5. The sheets 6 also have die-cut elongated openings 12 and 14 that, in their longitudinal direction, extend from the inside part of the rotor close to the outer circumference and that are slightly slanted in relation to the radius of the rotor. The openings 12 and 14 are located alternately in the circumferential direction of the rotor and are formed so that the openings 12 are slanted from the radial direction to the right and the openings 14 are slanted from the radial direction to the left. At the end facing the circumference of the rotor, the distance between the openings 12 and 14 is substantially equal around the entire rotor. Permanent-magnet pieces 18 are installed in the openings 12 and permanent-magnet pieces 20 are installed in the openings 14 so that the direction of excitation of the permanent-magnet pieces 18 is clockwise and the direction of excitation of the permanent-magnet pieces 20 is counter-clockwise as illustrated with the arrows Φ. Thus, on the outer circumference of the rotor in the circumferential direction, there are alternately N poles formed of the sections 26 and S poles formed of the segments 24. It is obvious to a person skilled in the art that the S poles and N poles can also be the other way round. At the inner ends of the openings 12 and 14, there are tangential elongated openings 16 that, when going clockwise, are between the end of the opening 12 and the end of the opening 14. Permanent magnets 22 are fitted into the openings 16 so that they excite in the same direction as the adjacent permanent magnets 18 and 20. Thus, in the case illustrated in FIG. 1, the openings 16 and the permanent magnets 22 are at the N poles.

According to FIG. 1, the shape of the sections 26 forming the N poles is tapered outwards, and the shape of the segments 24 forming the S poles is broadening outwards. The parts of the sheet pack forming the poles 24 and 26 in the rotor are integral to the inner part of the rotor 28 that is attached onto the shaft 2. The S poles 24 are connected to the inner part of the rotor body 28 with a wide area 30, so the S poles 24 constitute a strong and solid uniform piece with the inner part of the rotor. The sheets of the N poles 26 are connected to the sheets of the S poles on the outer circumference of the rotor with narrow necks or connecting strips 32 on both edges. Furthermore, the sheets of the N poles 26 are connected between the ends of the openings 12 and 16 and, correspondingly, openings 14 and 16 facing each other with another set of necks or connecting strips 34. The width of the necks 32 in the circumferential direction of the rotor is as small as possible to minimise the stray flux going through them. Correspondingly, the width of the neck 34 is small in order to prevent stray flux through it from an N pole to the adjacent S pole. The necks 32 and 34 must retain the integrity of the sheets during sheet pack manufacture and bear the forces imposed on them during operation.

According to the inventive idea of the patent, radial forces imposed on the N pole 26, such as centrifugal forces, push the N pole outwards, making its side parts contact the permanent-magnet pieces 18 and 22 on its edges that will further contact the slanted side parts of the S poles 24. When the S poles are tightly connected to the shaft 2 through the inner part 28 of the rotor, the N poles 24 and the permanent-magnet pieces 18 and 22 between the S and N poles are also reliably supported on the rotor body and shaft. Correspondingly, the permanent-magnet pieces 22 between the N poles and the inner part of the rotor are similarly supported against radial forces through the N poles 26.

FIG. 2 illustrates another permanent-magnet rotor according to the invention for an electrical machine in which the number of poles is six. The rotor 104 deviates from the embodiment illustrated in FIG. 1 so that the rotor poles are constructed differently and that the direction of excitation of the permanent-magnet pieces is different, as described in more detail below. The rotor 104 is created by stacking ferromagnetic sheets 106 into a sheet pack, and a shaft 2 is installed in the middle into holes die-cut into the sheets for the purpose. The sheets 106 also have die-cut elongated openings 112 and 114 that, in their longitudinal direction, extend from the inside part of the rotor close to the outer circumference and that are slightly slanted in relation to the radius of the rotor. The openings 112 and 114 are located alternately in the circumferential direction of the rotor and are formed so that the openings 112 are slanted from the rotor's radial direction to the right and the openings 114 are slanted from the radial direction to the left. Permanent-magnet pieces 118 and 119 are alternately installed in the openings 112 so that the direction of excitation of the permanent-magnet piece 118 is clockwise and the direction of excitation of the permanent-magnet piece 119 is counter-clockwise as illustrated with the arrows Φ. Permanent-magnet pieces 120 and 121 are alternately installed in the openings 114 so that the direction of excitation of the permanent-magnet pieces 120 is counter-clockwise and the direction of excitation of the permanent-magnet pieces 121 is clockwise. Thus, in the outer circumferential direction of the rotor, there are alternately S poles formed of the sections 124 and N poles formed of the sections 126. Segments 125 and 127 remain between the sections 124 and 126. At the inner ends of the openings 112 and 114, there are tangential elongated openings 116 that, when going clockwise, are between the end of the opening 112 and the end of the opening 114. Permanent magnets 122 and 123 are fitted alternately into adjacent openings 116 so that the permanent magnets 122 are at the S poles 124 and excite towards the rotor shaft 2, and the permanent magnets 123 are at the N poles 126 and excite the rotor's circumference 140. In the embodiment according to FIG. 2, the outer circumference of the rotor is gently waved similarly to the case in FIG. 1 so that at the poles 124 and 126, the radius of the rotor is slightly greater than between the poles.

In the embodiment illustrated in FIG. 2, the shape of both the N poles 126 and the S poles 124 is tapered outwards. The shape of the segments 125 and 127 remaining between the poles 124 and 126 is broadening outwards. The parts of the sheet pack forming the poles 124 and 126 in the rotor, as well as the segments 125 and 127, are integral to the inner part of the rotor 28 that is attached onto the shaft 2. The segments 125 and 127 are connected to the inner part of the rotor body 28 with wide areas 130, so the segments 125 and 127 constitute a strong and solid uniform piece with the inner part of the rotor. The sheets of the sections 124 and 126 forming the poles are connected to the sheets of the segments on the outer circumference of the rotor with narrow necks or connecting strips 132 on both edges. Furthermore, the sheets of the pole sections 124 and 126 are connected between the ends of the openings 112 and 116 and, correspondingly, openings 114 and 166 facing each other with another set of necks or connecting strips 134. The width of the necks 132 in the circumferential direction of the rotor is as small as possible to minimise the stray flux going through them. Correspondingly, the width of the neck 134 is small in order to prevent stray flux through it from an N pole to the adjacent S pole. The necks 132 and 134 must retain the integrity of the sheets during sheet pack manufacture and bear the forces imposed on them during operation.

The width of the areas 130 is substantially greater than the width of the necks 132 and 134 in order to create a sufficient supporting piece. Correspondingly to the embodiment in FIG. 1, according to the inventive idea, all parts of the rotor are supported against radial forces. Centrifugal forces imposed on the sections 124 and 126 push the pole parts outwards, making their side parts contact the permanent-magnet pieces 118 and 119 and, correspondingly, 120 and 121 on the edges that will further contact the slanted side parts of the segments 125 and 127. When the segments are tightly connected to the shaft 2 through the inner part 28 of the rotor, the sections 124 and 126 and the permanent-magnet pieces 118-121 on their sides are also reliably supported on the rotor body and shaft. Correspondingly, the permanent-magnet pieces 122 and 123 between the poles and the inner part of the rotor are similarly supported against radial forces through the sections 124 and 126 constituting the pole parts.

In the embodiments illustrated in FIGS. 1 and 2, the adjacent pole parts of the rotor and, correspondingly, the pole parts and the segments between the poles, are connected to each other with narrow necks of material at the ends of the magnet openings. The following is a description of alternative embodiments in which the necks connecting the pole parts to the rotor are missing completely or from some magnet openings. FIG. 3 illustrates the cross-section of one pole 224 of the rotor in the axial direction of the rotor, in which the magnet openings 312 and 314 are open near the circumference of the rotor. There is a fixing lug or extrusion 316 formed on the outer edges of the pole section 224, overlapping the end of the permanent-magnet piece 318. At the other end, the magnet openings are closed as in the examples of FIGS. 1 and 2. In the embodiment of FIG. 3, the stray flux route is blocked on the outer circumference through the magnetic sheet between the section 224 and the adjacent segment 226, which reduces stray flux close to the air gap of the machine. However, the segments and sections of the rotor are integral and joined to the rotor body, which facilitates manufacture and handling of the sheets during sheet pack assembly.

The embodiment in FIG. 4 is otherwise similar to the solution in FIG. 3 but in this case, the fixing lugs 416 are arranged in the segment 426, which means that the side wall 428 of the outward tapered section 424 is straight and ends at the end of the permanent magnet piece 418, subsequently curving into the outer circumferential surface of the pole 424. In the embodiments of FIGS. 3 and 4, the outward tapered sections are also supported against radial forces on the outward broadening segments through the permanent magnet pieces in between.

FIG. 5 illustrates an embodiment in which there are no necks of material between adjacent permanent-magnet openings within the rotor and there are no necks of magnetically conductive material between the sections and the segments, but there is a magnetically non-conductive part 500 between the permanent-magnet pieces 516 and 522 and, correspondingly, 518 and 522 that is filled with resin, for example. The fixing lugs 531 are arranged on the outer edges of the segment 526 and the fixing lugs 532 are arranged on the outer edges of the pole section 524.

The FIG. 5 suggestively illustrates a number of possible structural solutions for permanent magnets that can also be used to implement a solution according to the invention. The permanent-magnet pieces 516 and 522 are curved. However, the permanent-magnet piece to the right of the illustrated pole 524 is formed of two partial pieces 518 and 518' that are in a slightly shifted position in relation to each other in the tangential direction. In this case, the outward tapered section is completely surrounded by magnet openings with the exception of narrow necks close to the outer circumference of the rotor. As has been described above, also in this case the radial forces are supported on the rotor body through the outward broadening segment. The embodiments of permanent-magnet pieces illustrated in FIG. 5 are examples, and naturally, only one embodiment is used in any single machine. In all cases, each permanent magnet exciting a pole consists of one or more pieces in the longitudinal direction of the machine as is known of the art.

FIG. 6 illustrates an embodiment in which there are no necks of material between adjacent permanent-magnet openings within the rotor and the section 624 is separate from the segments 626 that are on the both sides of the section 624. The fixing lugs or extrusions 632 are arranged on the outer edges of the section 624. On the side of the segment 626 there is a lug 633 opposite to the lug 632. The permanent magnet 618 is locating in the opening that is formed of the lugs 632 and 633 at the ends of the permanent magnet 618 and of the side edge 634 of the section 624 and of the side edge 635 of segment 626. The section 624 is supported against the centrifugal force via the permanent magnet 618 and the side edge 635 of the segment. Further the section is supported against the force towards the centre of the rotor via the permanent magnet 618 and the lug 633. The opening 636 between the section and the inner part of the rotor body 628 is empty. Naturally, a piece of permanent magnet can be positioned into the opening, if additional magnetizing flux is required. Alternatively the opening can be filled with some other material for supporting or fixing purposes.

Further to the permanent-magnet openings being half-open towards the outer circumference of the rotor—that is, the air gap of the machine—as described above, they can also be fully open within the scope of the inventive idea.

The invention has been described above with the help of certain embodiments. The embodiments of the invention may vary within the scope of the following claims.

The invention claimed is:

1. A rotor for an electrical machine excited by permanent magnets, comprising:
    a substantially cylindrical magnetic body of the rotor fitted onto a shaft of the electrical machine; and,
    plural sets of permanent magnets that establish alternating first and second poles in a circumferential direction of the rotor, wherein permanent magnet pieces in the sets of permanent magnets are fitted into openings arranged in the rotor and are excited in opposite directions, and wherein each of the plural sets of permanent magnets is fitted at least on an edge of at least one of the first and second pole,
    wherein the body includes plural segments that extend from the shaft to an outer circumference of the rotor in the circumferential direction, each segment having an outer side that forms the outer circumference of the rotor and edges on either side that extend from the shaft to the outer circumference of the rotor to establish an acute angle with the outer side, between the edges, wherein the body includes plural sections, and each section tapers outwardly in a radial direction of the rotor, and
    wherein the permanent magnet pieces of respective permanent magnet sets are arranged between each section and segment.

2. The rotor according to claim 1, wherein the segments and the outward tapered sections and the permanent-magnet pieces constitute a shape-locked structure with regard to centrifugal forces.

3. The rotor according to claim 1, wherein the segments form the first pole and the tapered sections form the second pole.

4. The rotor according to claim 1, wherein the permanent magnet pieces in each set of permanent magnets positioned on the edges of at least one of the first and second poles are slanted in relation to each other in the radial direction of the rotor, and are excited in a first direction, wherein the permanent magnet pieces in each set of permanent magnets are closer to each other at an end facing the outer circumference of the rotor compared to an end facing the shaft of the electrical machine, such that at least one of the first and second pole tapers outwardly.

5. The rotor according to claim 4, wherein each outward tapered pole includes a second permanent magnet located between the ends of the set of permanent magnets on the edge facing the shaft.

6. The rotor according to claim 1, wherein one of the first and second poles excited in a first direction is formed of a first section in one of the plural segments, and the other of the first and second poles excited in a second direction is formed of a next section in one of a same segment as the first section or in an adjacent segment in the circumferential direction of the rotor.

7. The rotor according to claim 6, wherein each section is substantially wider than any portion of a segment remaining between them.

8. The rotor according to claim 6, wherein a second permanent magnet is positioned between the ends of the set of permanent magnets on the edges of at least one of the first and second poles facing the shaft of the rotor.

9. The rotor according to claim 1, wherein portions of the rotor forming the first and the second pole are separate from each other.

10. The rotor according to claim 9, wherein an extrusion is formed at the edge of each segment on the outer edge of the rotor, and overlaps an end of the permanent magnet.

11. The rotor according to claim 9, wherein an extrusion is formed at the edge of each section on the outer edge of the rotor, and overlaps an end of the permanent magnet.

12. The rotor according to claim 1, wherein adjacent segments and sections are connected to each other by a narrow neck of material.

13. The rotor according to claim 1, wherein at least one of the rotor body, segments, and sections are manufactured of ferromagnetic sheets.

14. The rotor according to claim 1, wherein at least one of the rotor body, segments, and sections are cast.

15. The rotor according to claim 1, wherein at least one of the rotor body, segments, and are manufactured of magnetically conductive powder metal.

16. The rotor according to claim 2, wherein the each segment forms a first pole and each tapered section forms a second pole.

17. The rotor according to claim 2, wherein one of the first and second poles is excited in a first direction and is formed of a first section, and the other of the first and second poles is excited in a second direction and is formed of a next section in the circumferential direction of the rotor.

18. The rotor according to claim 7, wherein a second permanent magnet is positioned between the ends of each set of permanent magnets on the edges of at least one of the first and second poles facing the shaft of the rotor.

19. The rotor according to claim 2, wherein the first and the second poles are formed from portions of the rotor, wherein the portions of the rotor are separate from each other.

20. The rotor according to claim 3, wherein the the first and the second poles are formed from portions of the rotor, wherein the portions of the rotor are separate from each other.

* * * * *